(No Model.)
A. WEYMAR.
SAW.
No. 416,281.            Patented Dec. 3, 1889.
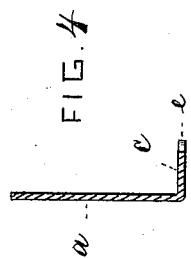
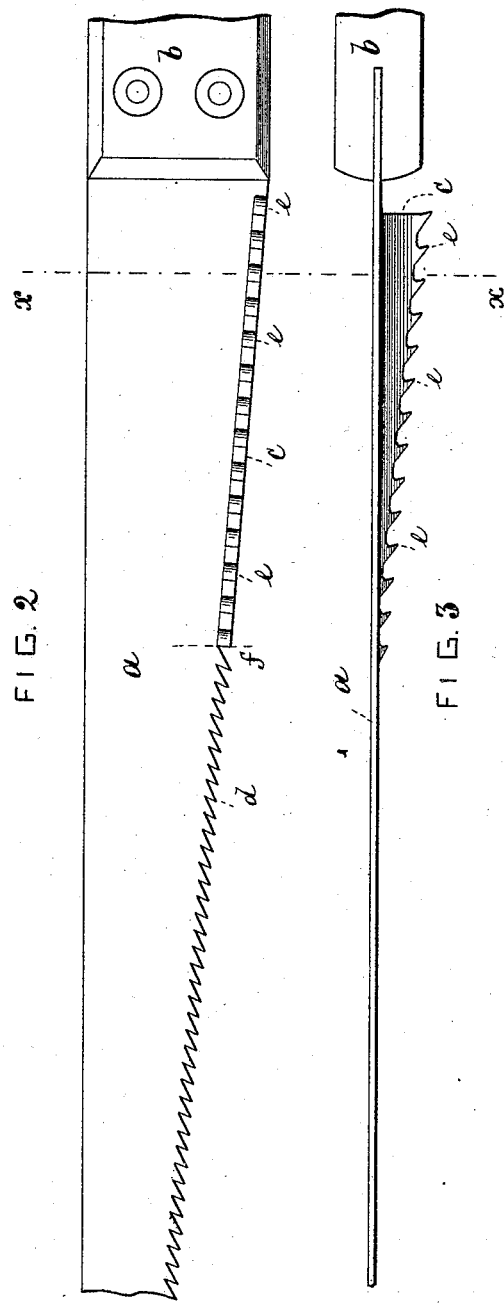
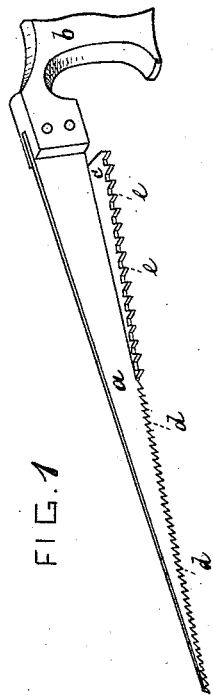
WITNESSES
Wm N. Lowe
A. Jonghmans.
INVENTOR
Adolph Weymar
by his attorneys
Roeder & Briesen

UNITED STATES PATENT OFFICE.

ADOLPH WEYMAR, OF BROOKLYN, ASSIGNOR OF ONE-HALF TO FREDERICK W. DUNTON, OF NEW YORK, N. Y.

SAW.

SPECIFICATION forming part of Letters Patent No. 416,281, dated December 3, 1889.

Application filed August 16, 1889. Serial No. 320,978. (No model.)

*To all whom it may concern:*

Be it known that I, ADOLPH WEYMAR, of Brooklyn, New York, have invented an Improved Saw, of which the following is a specification.

This invention relates to a hand-saw in which the blade is partly turned over so as to lie in two planes for part of its length. The saw is designed for cutting out square holes, which operation is performed by thrusting the bent-over part down through the wood, to start a new side after the preceding side has been cut.

The object of the invention is to so place the teeth upon the saw that they will not be apt to tear the wood while thus starting a side. To this effect I incline the teeth upon the turned-over part of the blade toward the handle, while the teeth upon the main part of the blade are inclined toward the lower end of the saw.

In the accompanying drawings, Figure 1 is a perspective view of my improved saw. Fig. 2 is a face view of the same on an enlarged scale. Fig. 3 is a rear edge view of the same on an enlarged scale; and Fig. 4, a cross-section on line $x\ x$, Figs. 3 and 4.

The letter $a$ represents a saw-blade attached to a handle $b$, and turned over at its upper part to form the triangular flap $c$.

$d\ d$ are the teeth upon the lower part of blade $a$, as contradistinguished from flap $c$. These teeth all point or are inclined toward the lower end or point of the saw.

$e\ e$ are the teeth upon the flap $c$. These teeth are all inclined or point toward the handle $b$, or toward the upper part of the saw. Thus it will be seen that the teeth $d$ face in opposite direction from the teeth $e$. The advantage derived from this construction will be apparent when the working of the saw is understood.

In cutting the first side of a square hole with the teeth $d$ the saw is started at or near the point $f$, and is drawn up through the work, so that the back of teeth $d$ cut the first groove of the kerf. This is done, of course, for preventing the work from tearing. After finishing the first side of the hole the second side is started by pushing the flap $c$ through the work. During this operation the teeth $e$ are from the point $f$ forced down through the work.

It will be seen that were the teeth $e$ of flap $c$ set in the same direction as teeth $d$ the teeth $e$ would tear the work, inasmuch as their cutting edge or face would cut the first groove of the kerf; but by setting the teeth $e$ in a different direction to teeth $d$ their backs make the primary groove, and thus pass properly through the work. Thus while the teeth $d$ and $e$ are drawn in opposite directions through the wood from a common point $f$, to make the primary grooves, such primary grooves will be formed in both cases by the backs of the teeth.

The teeth $e$ should be placed somewhat wider apart than the teeth $d$.

What I claim is—

The combination of saw-blade $a$, having turned-over flap $c$, with handle $b$, the teeth $d$ on blade $a$ being inclined in opposite direction from teeth $e$ on flap $c$, substantially as and for the purpose specified.

ADOLPH WEYMAR.

Witnesses:
 F. V. BRIESEN,
 A. JONGHMANS.